(12) United States Patent
Lu

(10) Patent No.: US 8,878,725 B2
(45) Date of Patent: Nov. 4, 2014

(54) SYSTEM AND METHOD FOR GEOLOCATION OF MULTIPLE UNKNOWN RADIO FREQUENCY SIGNAL SOURCES

(75) Inventor: Ning Hsing Lu, Clifton, NJ (US)

(73) Assignee: Exelis Inc., McLean, VA (US)

( * ) Notice: Subject to any disclaimer, the term of this patent is extended or adjusted under 35 U.S.C. 154(b) by 402 days.

(21) Appl. No.: 13/111,379

(22) Filed: May 19, 2011

(65) Prior Publication Data

US 2012/0293371 A1 Nov. 22, 2012

(51) Int. Cl.
| | | |
|---|---|---|
| G01S 5/12 | (2006.01) | |
| G01S 1/04 | (2006.01) | |
| G01S 5/02 | (2010.01) | |
| G01S 5/06 | (2006.01) | |
| G01S 5/14 | (2006.01) | |

(52) U.S. Cl.
CPC ... *G01S 1/04* (2013.01); *G01S 5/02* (2013.01); *G01S 5/0263* (2013.01); *G01S 5/06* (2013.01); *G01S 5/14* (2013.01)
USPC .......................................... 342/450; 342/451

(58) Field of Classification Search
CPC .............................. G01S 5/0257; G01S 5/0263
USPC ................................................. 342/450, 451
See application file for complete search history.

(56) References Cited

U.S. PATENT DOCUMENTS

| | | | |
|---|---|---|---|
| 4,797,839 A | 1/1989 | Powell | |
| 5,055,851 A | 10/1991 | Sheffer | |
| 5,767,804 A | 6/1998 | Murphy | |
| 5,987,329 A * | 11/1999 | Yost et al. | 455/456.1 |
| 6,018,312 A | 1/2000 | Haworth | |
| 6,141,558 A | 10/2000 | Chen | |
| 6,259,404 B1 | 7/2001 | Parl et al. | |
| 6,414,634 B1 | 7/2002 | Tekinay | |
| 6,865,490 B2 * | 3/2005 | Cauwenberghs et al. | 702/17 |
| 7,071,791 B1 | 7/2006 | Wilson, III | |
| 7,292,189 B2 | 11/2007 | Orr et al. | |
| 7,564,408 B2 | 7/2009 | Glockler et al. | |
| 7,616,155 B2 * | 11/2009 | Bull et al. | 342/387 |

(Continued)

FOREIGN PATENT DOCUMENTS

WO 2007063537 A1 6/2007

OTHER PUBLICATIONS

Buchner et al, "A Generalization of Blind Source Separation Algorithms for Convolutive Mixtures Based on Second-Order Statistics," IEEE Trans. on Speech and Audio Processing, vol. 13, No. 1, Jan. 2005.*

(Continued)

*Primary Examiner* — Gregory C Issing
(74) *Attorney, Agent, or Firm* — Edell, Shapiro & Finnan, LLC

(57) ABSTRACT

According to an embodiment of the present invention, geolocations of multiple unknown radio frequency (RF) signal sources are determined using three-dimensional (3-D) geolocation techniques. The three-dimensional (3-D) geolocation techniques obtain reliable geolocation estimates of radio frequency (RF) emitters based on energy or received signal strength (RSS) of emitter transmitted signals and based on their time differences of arrival (TDOAs) at various sensor locations. The energy based geolocations and the time difference of arrival (TDOA) geolocations are combined to determine an overall set of geolocations for multiple unknown radio frequency (RF) signal sources. The geolocation information is used to track and monitor the locations of the multiple emitters.

28 Claims, 7 Drawing Sheets

(56) References Cited

U.S. PATENT DOCUMENTS

| | | |
|---|---|---|
| 7,623,871 B2 | 11/2009 | Sheynblat |
| 8,615,190 B2 | 12/2013 | Lu |
| 2001/0053699 A1 | 12/2001 | McCrady et al. |
| 2003/0204380 A1* | 10/2003 | Dishman et al. ............ 702/189 |
| 2004/0029558 A1 | 2/2004 | Liu |
| 2004/0174258 A1 | 9/2004 | Edelstein et al. |
| 2004/0233100 A1* | 11/2004 | Dibble et al. ............ 342/357.06 |
| 2005/0032531 A1 | 2/2005 | Gong et al. |
| 2005/0077424 A1 | 4/2005 | Schneider |
| 2005/0242995 A1 | 11/2005 | Ferreol et al. |
| 2005/0281363 A1 | 12/2005 | Qi et al. |
| 2006/0009236 A1* | 1/2006 | Bose et al. ............ 455/456.1 |
| 2006/0038677 A1 | 2/2006 | Diener et al. |
| 2006/0128311 A1 | 6/2006 | Tesfai |
| 2006/0240839 A1 | 10/2006 | Chen et al. |
| 2007/0069949 A1 | 3/2007 | Ferreol et al. |
| 2007/0115175 A1 | 5/2007 | Velicer et al. |
| 2008/0129600 A1 | 6/2008 | Thomas |
| 2008/0130604 A1* | 6/2008 | Boyd ............ 370/338 |
| 2008/0186235 A1 | 8/2008 | Struckman et al. |
| 2009/0146881 A1 | 6/2009 | Mesecher |
| 2010/0034133 A1 | 2/2010 | Marom et al. |
| 2010/0106745 A1 | 4/2010 | Cho et al. |
| 2010/0151810 A1 | 6/2010 | Besoli et al. |
| 2010/0190507 A1 | 7/2010 | Karabinis et al. |
| 2010/0284359 A1 | 11/2010 | Kim et al. |
| 2010/0321242 A1 | 12/2010 | Robinson et al. |
| 2011/0018766 A1 | 1/2011 | Steer et al. |
| 2011/0199916 A1 | 8/2011 | Garrett et al. |
| 2012/0235864 A1 | 9/2012 | Lu |
| 2012/0309288 A1 | 12/2012 | Lu |
| 2013/0027251 A1 | 1/2013 | Lu |

OTHER PUBLICATIONS

Ukai et al, "Multistage SIMO-Model-Based Blind Source Separation Combining Frequency Domain ICA and Time Domain ICA," IEEE International Conference on Acoustics, Speech, and Signal Processing, vol. 4, 2004, pp. 109-112.*

Aichner et al, "Post Processing for Convolutive Blind Source Separation," Proc. IEEE Internatinal Conf Acoustics, Speech, Signal Processing (ICASSP), vol. 5, pp. 37-40, May 2006.*

Seungjin Choi, et al., "Blind Source Separation and Independent Component Analysis: A Review", Neural Information Processing—Letters and Reviews, vol. 6, No. 1, Jan. 2005, pp. 1-57.

Wikipedia Article, "Multilateration", Feb. 17, 2010 version, pp. 1-5.

Wikipedia Article, "Trilateration", Feb. 9, 2010 version, pp. 1-3.

European Search Report, EP12159186, Jul. 11, 2012, 6 pages.

Robinson et al., "Received Signal Strength Base Location Estimation of a Wireless LAN Client", IEEE Communications Society, Wireless Communications and Networking Conference 2005, pp. 2350-2354.

Lu, "A Signal-to-Noise Ratio Enhancer", SAS 2011—IEEE Sensors Application Symposium, Feb. 22-24, 2011, 5 pages.

European Search Report, EP1216677, Sep. 12, 2012, 6 pages.

European Search Report, EP12166578, Oct. 1, 2012, 6 pages.

Cardoso, "Blind Signal Separation: Statistical Principles", Proceedings of the IEEE, vol. 86, No. 10, Oct. 1998, pp. 2009-2025.

Xinrong Li, "RSS-Based Location Estimation With Unknown Pathloss Model", IEEE Transactions on Wireless Communications, vol. 5, No. 12, Dec. 2006; pp. 3626-3633.

Ralph O. Schmidt, "Multiple Emitter Location and Signal Parameter Estimation", IEEE Transactions on Antennas and Propagation, vol. AP-34, No. 3, Mar. 1986; pp. 276-280.

George V. Serebryakov, "Direction-of-Arrival Estimation of Correlated Sources by Adaptive Beamforming", IEEE Transactions on Signal Processing, vol. 43, No. 11, Nov. 1995; pp. 2782-2787.

Yihong Qi et al., "On Time-of-Arrival Positioning in a Multipath Environment", IEEE Transactions on Vehicular Technology, vol. 55, No. 5, Sep. 2006; pp. 1516-1526.

A. Tennant et al., "Direction Finding Using a Four-Element Time-Switched Array System", 2008 Loughborough Antennas & Propagation Conference; Mar. 17-18, 2008, Loughborough, UK; 2008 IEEE; pp. 181-184.

A. Tennant et al., "A Two-Element Time-Modulated Array With Direction-Finding Properties", IEEE Antennas and Wireless Propagation Letters, vol. 6, 2007; pp. 64-65.

Harry Urkowitz, "Energy Detection of Unknown Deterministic Signals", Proceedings of the IEEE, vol. 55, No. 4, Apr. 1967; pp. 523-531.

Ning H. Lu, "Linearized, Unified Two-Ray Formulation for Propagation over a Plane Earth", Sicon/05—Sensors for Industry Conference; Houston, Texas, USA, Feb. 8-10, 2005.

Guolin Sun et al., "Signal Processing Techniques in Network-Aided Positioning", IEEE Signal Processing Magazine [12] Jul. 2005.

Bo-Chieh Liu et al., "Analysis of Hyperbolic and Circular Positioning Algorithms Using Stationary Signal-Strength-Difference Measurements in Wireless Communications", IEEE Transactions on Vehicular Technology, vol. 55, No. 2, Mar. 2006; pp. 499-509.

Ada S. Y. Poon et al., "Degrees of Freedom in Multiple-Antenna Channels: A Signal Space Approach", IEEE Transaction Information Theory Society, vol. 51, Issue 2.

Seungjin Choi, "Blind Source Separation and Independent Component Analysis: A Review", Neural Information Processing—Letters and Review, Vol. 6, No. 1, Jan. 2005, pp. 1-57.

Ludwig Rota et al., "Parallel Deflation with Alphabet-Based Criteria for Blind Source Extraction", Proc. SSP-2005, 13th IEEE Workshop on Statistical Signal Processing, Jul. 2005, pp. 1-5.

J. Durbin et al., "Time series analysis of non-Gaussian observations based on state space models from both classical and Bayesian perspectives", Dec. 1998, pp. 1-26.

Shlomo Dubnov, "Generalization of Spectral Flatness Measure for Non-Gaussian Linear Processes", Oct. 30, 2002, pp. 1-6.

M. Ryyan Khan et al., "Iterative Noise Power Subtraction Technique for Improved SNR in Speech Enhancement", pp. 1-3.

Fredrik Gustafsson et al., "Positioning Using Time-Difference of Arrival Measurements", pp. 1-4.

European Search Report dated Dec. 20, 2013, EP12177418, 3 pages.

"Pursuing A Lost Course", Electronics World, Nexus Media Communications, Swanley, Kent, GB, vol. 97, No. 1674, May 1, 1992, pp. 424-427, XP000290553, ISSN: 0959-8332.

* cited by examiner

SYSTEM AND METHOD FOR GEOLOCATION OF MULTIPLE UNKNOWN RADIO FREQUENCY SIGNAL SOURCES

BACKGROUND

1. Technical Field

The present invention embodiments pertain to geolocating signal sources. In particular, the present invention embodiments pertain to geolocation of multiple unknown signals from radio frequency emitters.

2. Discussion of Related Art

Conventional techniques for geolocation of radio frequency (RF) emitters are commonly based on measurements of received signal strength (RSS) of signals transmitted from the emitter. These conventional geolocation systems usually require a filtering or a transform mechanism to maximize the signal to noise ratio of the target signal based on the known signal characteristics.

However, when a number of signals are coming from different emitter sources, and a number of sensors are used to collect the measured data, each sensor receives a linear combination of the source signals. Neither the structure of the linear combinations nor the waveforms of the source signals are known to the sensors. The signals could be continuous wave, pulsed, swept, narrowband, broadband, etc. In addition, these source signals may overlap in both time and/or in frequency spectrum. The unknown signal characteristics and overlapping source signals present challenges to the conventional geolocation system.

SUMMARY

An embodiment of the present invention pertains to a plurality of geolocation techniques that determine the geolocation of multiple unknown radio frequency (RF) sources (referred to herein as geolocation of multiple unknown signals (GMUS)). As unknown radio frequency (RF) signals are received via one or more antennas, the unknown radio frequency (RF) signals are digitized and stored in memory. The digitized signals are then separated into narrowband and broadband signals using a technique referred to as blind source separation (BSS). The narrowband signals are further processed using a three dimensional (3-D) energy-based emitter geolocation technique to generate narrowband geolocation data, while the broadband signals are processed using time difference of arrival geolocation (TDOAG) techniques to generate broadband geolocation data. The narrowband and broadband geolocation data is then combined or fused to produce an overall set of geolocation data. The geolocation provides range or distance, and relative bearing to one or more emitters of interest which can be used to generate emitter coordinates and elevation. The technique may be employed with small unmanned aerial or air vehicles (UAV), and obtains reliable geolocation estimates of unknown radio frequency (RF) sources.

The above and still further features and advantages of present invention embodiments will become apparent upon consideration of the following detailed description of example embodiments thereof, particularly when taken in conjunction with the accompanying drawings wherein like reference numerals in the various figures are utilized to designate like components.

DETAILED DESCRIPTION OF EXAMPLE EMBODIMENTS

Embodiments of the present invention pertain to geolocation of multiple unknown radio frequency (RF) signals (GMUS) using three-dimensional (3-D) geolocation techniques when neither the structure of a linear combination of signals received from sources, nor the waveforms emitted by those sources, are known at a sensor receiver. The three-dimensional (3-D) geolocation techniques obtain reliable geolocation estimates of radio frequency (RF) emitters based on energy or received signal strength (RSS) of emitter transmitted signals and their time differences of arrival (TDOAs) at various sensor locations. The energy based geolocations and the time difference of arrival (TDOA) geolocations are combined to determine an overall set of geolocations for multiple unknown radio frequency (RF) signal sources. The geolocation information is used to track and monitor the locations of the multiple emitters. The geolocation of a radio frequency (RF) emitter is a critical need for many applications including gathering emitter information, and locating spurious or interfering emitters. The technique of present invention embodiments may be employed with unmanned air vehicles (UAV) or mobile terrain based sensors. The unmanned air vehicles (UAV) are usually small, utilized for low altitudes, and employ typical guidance technologies for operation (e.g., following pre-planned or manually provided paths or waypoints). The unmanned air or mobile terrain based vehicles are well suited for enabling three-dimensional (3-D) geolocation of multiple unknown radio frequency (RF) sources.

Figure 1:
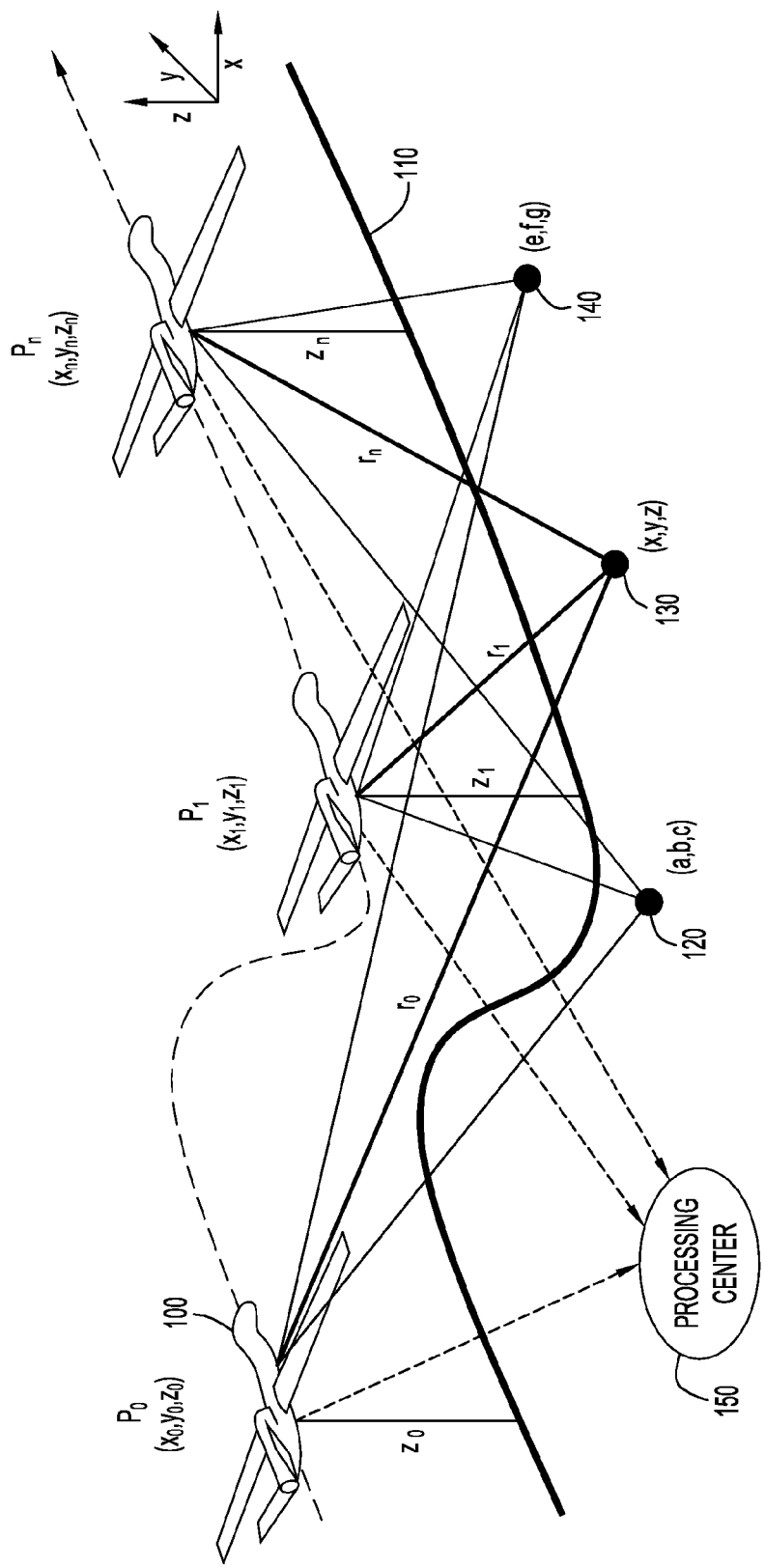
FIG. 1 is a diagrammatic illustration of an example environment for determining geolocation of multiple unknown radio frequency (RF) emitter sources according to an embodiment of the present invention.

An example environment for determining the geolocation of radio frequency (RF) emitters in a three-dimensional space is illustrated in FIG. 1. Specifically, the environment includes a plurality of radio frequency (RF) emitters 120, 130, and 140, a mobile sensor 100 (e.g., an unmanned air vehicle (UAV) or other platform with a radio frequency (RF) sensor, etc.), and a data processing center 150. Radio frequency (RF) emitters 120, 130, and 140 transmit signals that the waveforms of the source signals may be known to mobile sensor 100. Mobile sensor 100 collects digital radio frequency (RF) data and may relay the data to processing center 150, another mobile sensor, or process the data onboard. The processing center 150 is a central location that performs geolocation processing (i.e., computing geolocations of multiple unknown emitters) according to the techniques described herein.

The mobile sensor travels along a pre-planned path 110 (e.g., a pre-planned flight path in the case of an unmanned air vehicle (UAV)). Mobile sensor 100 includes an antenna (not shown) that receives signals from radio frequency (RF) emitters 120, 130, and 140 in order to geolocate those signals as described below. The radio frequency (RF) emitters and mobile sensor are located within a three-dimensional space of the environment (e.g., defined by X, Y, and Z axes as illustrated in FIG. 1). Locations within the three-dimensional space may be represented by coordinates that indicate a position along each of the respective X, Y, and Z axes. By way of example, radio frequency (RF) emitters 120, 130, and 140 are positioned at an unknown locations (a, b, c), (x, y, z), and (e, f, g), respectively, within the three-dimensional space. Mobile sensor 100 receives signals transmitted from the radio frequency (RF) emitters at known locations along path 110 within the three-dimensional space (e.g., locations ($x_0$, $y_0$, $z_0$), ($x_1$, $y_1$, $z_1$), and ($x_n$, $y_n$, $z_n$) as viewed in FIG. 1). The Z axis represents the height or altitude, and indicates the offset between the mobile sensor and pre-planned path 110 (e.g., distances $z_0$, $z_1$, $z_n$ as viewed in FIG. 1).

Mobile sensor 100 measures signals at selected locations (e.g., ($x_0, y_0, z_0$), ($x_1, y_1, z_1$), and ($x_n, y_n, z_n$) as viewed in FIG. 1). At the selected locations, mobile sensor 100 is at an unknown distance or radius (r) from each of the emitters 120, 130, and 140, as depicted by the solid lines connecting the emitters to mobile sensor 100 as it traverses flight path 110. The techniques will be described hereinafter with reference to emitter 130 at location (x, y, z). The received signal strength (RSS) (e.g., $p_o$, $p_1$, $p_n$ as viewed in FIG. 1) of radio frequency (RF) signals emitted by emitter 130 are measured by mobile sensor 100. The received signal strength (RSS) at each location is proportional to the distance (e.g., $r_0, r_1, r_n$ as viewed in FIG. 1) between that location and radio frequency (RF) emitter 130. In addition to a received signal strength (RSS), mobile sensor 100 receives multipath signals, where the signals from each emitter 120, 130, and 140 may overlap in the time and/or frequency domains.

Figure 2:
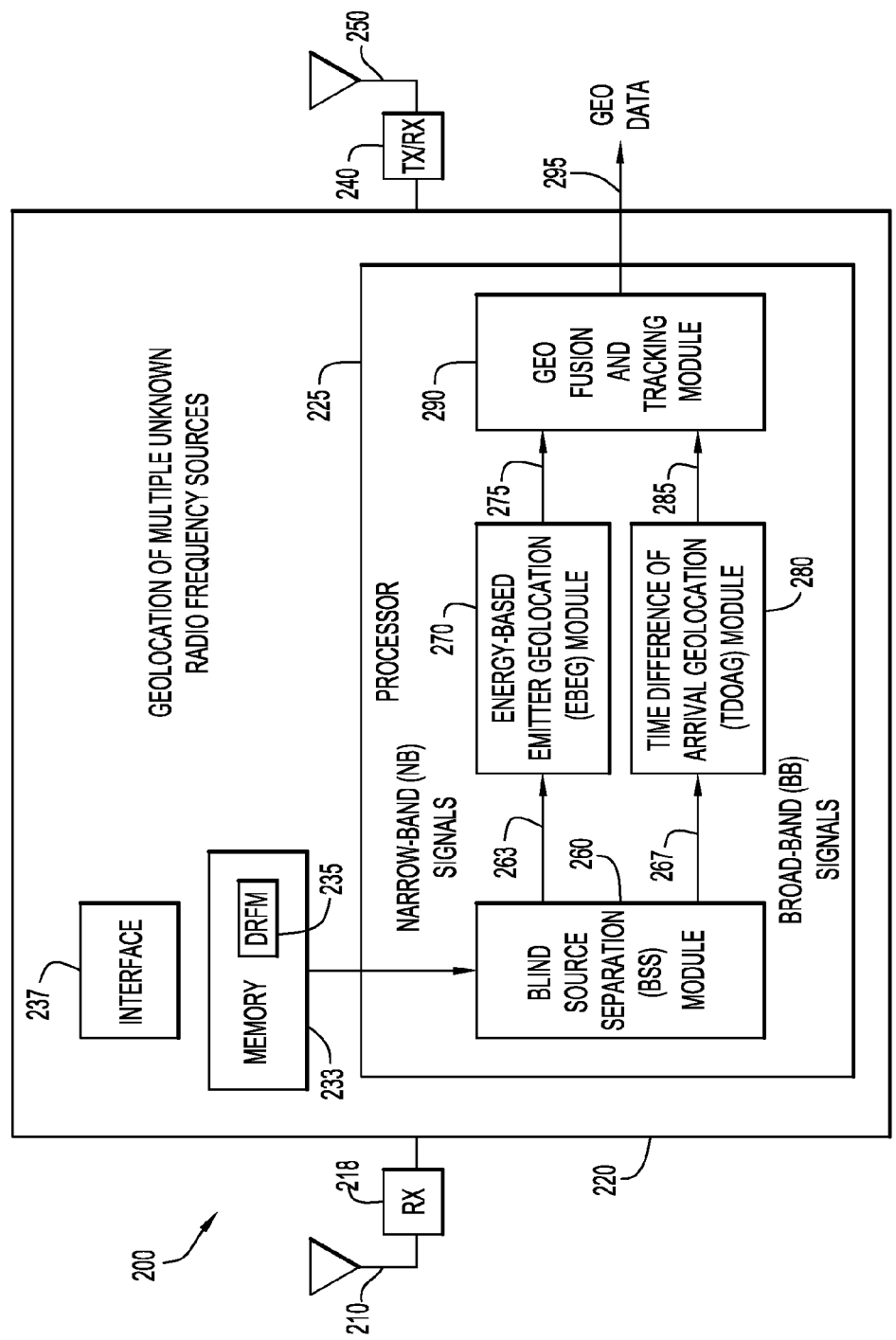
FIG. 2 is a block diagram of a GMUS system for determining geolocation of multiple unknown radio frequency (RF) emitter sources according to an embodiment of the present invention.

An example GMUS system 200 for determining the geolocation of multiple unknown radio frequency (RF) emitter sources according to an embodiment of the present invention is illustrated in FIG. 2. Initially, system 200 preferably resides on mobile sensor 100 (FIG. 1) to measure the received signal strength (RSS) and time difference of arrival information to determine the geolocation of radio frequency (RF) emitters. However, the processing and one or more other portions of system 200 may be remote from the mobile sensor and receive the emitter data for the geolocation determination (e.g., processing center 150 (FIG. 1)).

In particular, system 200 includes antenna 210, a receiver 218, a processing device 220, and a communications transceiver 240 with antenna 250. Antenna 210 may be implemented by an omni-directional antenna, or other suitable antenna, and directs received signals into receiver 218. The antenna may be implemented by any conventional or other antenna configurable to receive the signals emitted from radio frequency (RF) emitters 120, 130, and 140.

Processing device 220 may include a processor 225, a memory 233, and an interface unit 237. The memory 233 further comprises a digital radio frequency (RF) memory 235 for storing digitized radio frequency (RF) signals. The radio frequency (RF) signals may be sampled (digitized) by a sampling module that is associated with the receiver 218 or the processing device 220. Processor 225 includes a blind source separation (BSS) module 260, energy-based emitter geolocation (EBEG) module 270, a time difference of arrival geolocation (TDOAG) module 280, and a geolocation fusion and tracking module 290. The components of system 200 may be spread across multiple platforms. For example, mobile sensor 100 or other sensors at fixed locations may have a receiver and sampling module while the majority of computationally intense processing (e.g., for modules 260-290) is performed at processing center 150. Each sensor relays the sampled signals (e.g., data stored in digital radio frequency (RF) memory 235) back to processing center 150 for complete geolocation processing. Each of the modules 260-290 will be described below in connection with FIGS. 3-6.

Processor 225 may be implemented by any conventional or other computer or processing unit (e.g., a microprocessor, a microcontroller, systems on a chip (SOCs), fixed or programmable logic, etc.), where any of processing modules 260, 270, 280 and 290 may be implemented by any combination of any quantity of software and/or hardware modules or units. Memory 233 may be included within or external of processor 225, and may be implemented by any conventional or other memory unit with any type of memory (e.g., random access memory (RAM), read only memory (ROM), etc.). The memory may store the modules 260, 270, 280 and 290 for execution by processor 225, and data for performing the geolocation techniques of present invention embodiments. Interface unit 237 enables communication between system 200 and other devices or systems, and may be implemented by any conventional or other communications device (e.g., wireless communications device, etc.).

Briefly, blind source separation (BSS) module 260 separates the radio frequency (RF) signals into narrowband (NB) signals 263 and broadband (BB) signals 267. Narrowband (NB) signals 263 are fed or made available to energy-based emitter geolocation (EBEG) module 270 which produces narrowband (NB) geolocation data 275. Broadband (BB) signals 267 are fed to time difference of arrival geolocation (TDOAG) module 280 which produces broadband (BB) geolocation data 285. The narrowband (NB) geolocation data 275 and broadband (BB) geolocation data 285 are fed to geolocation fusion and tracking module 290. The geolocation fusion and tracking module 290 combines the input signals to render an overall set of geolocation data 295.

Transceiver 240 can be used to transmit data stored in digital radio frequency (RF) memory 235 to another platform for processing (e.g., to processing center 150 or to another fix based or mobile sensor). Transceiver 240 can also be used transmit any of the intermediate processing data (e.g., signals 263, 267, 275, or 285) as well as geolocation data 295. Conversely, transceiver 240 can be used to receive digital frequency (RF) data for storage in digital radio frequency (RF) memory 235 from another platform for processing. Transceiver 240 can also be used receive other data including narrowband and broadband signal data, and geolocation data.

Figure 3:
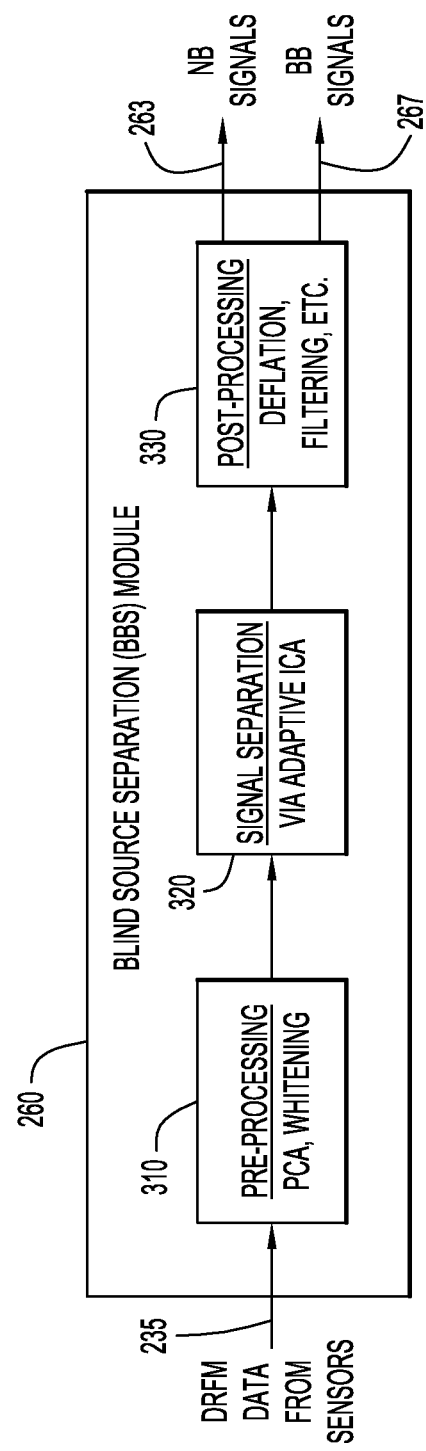
FIG. 3 is a block diagram detailing a blind source separation (BSS) module shown in FIG. 2.

Referring to FIG. 3, blind source separation (BSS) module 260 comprises a pre-processing module 310, a signal separation module 320, and a post-processing module 330. Modules 310-330 may be implemented in software, hardware, or a combination of both. Blind source separation (BSS), or sometimes called blind signal separation or blind source extraction, is a set of techniques by which source signals are separated without information (or very little information) about the source signals or how the source signal may be mixed when arriving at various sensors. A basic assumption underlying blind source separation (BSS) is that the source signals are statistically independent.

Pre-processing module 310 performs a decorrelation of the radio frequency (RF) samples stored in digital radio frequency (RF) memory data 235. The data are subject to principal component analysis (PCA). Principal component analysis (PCA) is a mathematical procedure that uses an orthogonal transformation to convert a set of observations of possibly correlated variables into a set of values of uncorrelated variables called principal components. The number of principal components is less than or equal to the number of original variables. The transformation is defined in such a way that the first principal component has as high a variance as possible (i.e., it accounts for as much of the variability in the data as possible), and each succeeding component in turn has the next highest variance possible under the constraint that it be orthogonal to (i.e., uncorrelated with) the preceding component. Principal components are guaranteed to be independent only if the data set under study is jointly normally distributed. Principal component analysis (PCA) can be performed by eigenvalue decomposition of a data covariance matrix or singular value decomposition of a data matrix. After the PCA, a process called whitening may be applied. Whitening is a process by which a transform is applied to the eigenvalue matrix of the PCA to equalize the power of the principal components. Principal component analysis (PCA) and data whitening are well known pre-processing techniques.

Signal separation module 320 performs independent component analysis (ICA). Independent component analysis (ICA) is an iterative or "learning" algorithm that separates the signal components provided via principal component analysis (PCA) into base sets of broadband and narrowband data that is "cleaned" by post-processing module 330. Post-processing tools include signal deflation and reconstruction. Deflation and reconstruction is the process of estimating the source signals one-by-one to reconstruct an estimate of an original source signal. Post-processing module 330 may also "clean" the resulting data set by removing or filtering undesirable components, noise, or artifacts. Ultimately, sets of narrowband (NB) signals 263 and broadband (BB) signals 267 are produced by blind source separation (BSS) module 260. The narrowband (NB) signals 263 are provided to energy-based emitter geolocation (EBEG) module 270 while broadband (BB) signals 267 are provided to time difference of arrival geolocation (TDOAG) module 280. It should be noted that any of the arrows shown between the various modules in FIGS. 3-6 represent vectors, matrices, or other data of various dimensions, and therefore, may represent multiple sets of signals or data.

Figure 4:
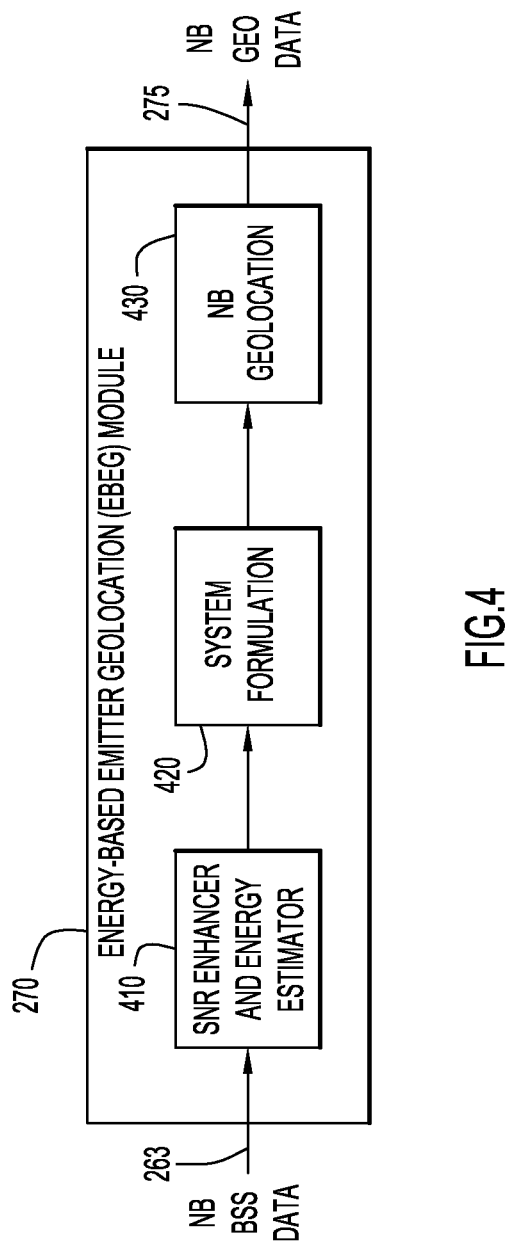
FIG. 4 is block diagram detailing an energy-based geolocation module shown in FIG. 2.

Energy-based emitter geolocation (EBEG) module 270 for determining geolocation data based on narrowband signals according to an embodiment of the present invention is illustrated in FIG. 4. Energy-based emitter geolocation (EBEG) module 270 comprises a signal-to-noise ratio (SNR) enhancer and energy estimation module 410, a system formulation module 420, and a geolocation module 430. Modules 410-430 may be implemented in software, hardware, or a combination of both. Narrowband (NB) blind source separation (BSS) data 263 are first processed by signal-to-noise ratio (SNR) enhancer and energy estimation module 410. Module 410 initially performs signal-to-noise ratio (SNR) enhancement by filtering the source data 263 using a number of a variety of techniques, e.g., using average received signal strength (ARSS) and maximum received signal strength (MRSS) approaches, to mitigate the radio channel impairments resulting from long-term and short-term channel variations. The ARSS approach is based on the average of a plural of the received signal strength (RSS) measurements. The MRSS approach selects the strongest RSS among a plural of the RSS measurements to enhance the SNR. As noted, the relative performance enhancement between MRSS and ARSS increases monotonically as a function the number of measurements n. The relative performance enhancement starts at 0 dB when n=1, then increases to 5.5 dB when n=10, and reaches 8 dB when n=100. Using modeling and simulation, it has been shown that the MRSS approach outperforms the ARSS approach in the Rayleigh distributed fading environment for about 5-8 dB when the number of measurements is greater than 4. Therefore, the signal-to-noise ratio (SNR) enhancer adopts the MRSS approach for the GMUS.

The enhanced signal-to-noise ratio (SNR) data are then processed by module 410 to estimate the energy (e.g., to estimate a received signal strength (RSS) of the received signals) associated with the narrowband components. The energy estimation uses the coherent integration of the received signal strength (RSS). Since the energy of the signal is proportional to the distance from the sample point to the emitter, samples with the maximum signal-to-noise ratio (MSNR) are selected from the various sampling points (e.g., $p_0, p_1, p_n$ measured at locations $(x_0, y_0, z_0)$, $(x_1, y_1, z_1)$, and $(x_n, y_n, z_n)$ as viewed in FIG. 1) as a measure of distance that can be used to geolocate the emitter as described below. Data points of interest are loaded into the appropriate memory locations by system formulation module 420 as each sampling point is traversed (i.e., system formulation module 420 manages the input data for geolocation module 430). At some point in time, when at least a minimum number of samples have been loaded, geolocation module 430 produces narrowband (NB) geolocation data 275. For example, the selected maximum signal-to-noise ratio (MSNR) measurements are provided to geolocation module 430 to determine the geolocation of radio frequency (RF) emitters 120, 130, and 140 (FIG. 1) when those emitters have narrowband components.

Geolocation module 430 computes geolocations of radio frequency (RF) emitters 120, 130, and 140 from a set of simultaneous equations incorporating a Least Mean Square (LMS) technique. Each the maximum signal-to-noise ratio (MSNR) measurement that is provided to geolocation module 430 is the measurement with the maximum signal to noise ratio selected from the processed sample set for each sampling location. The received signal measurements may be collected by using an unmanned air vehicle (UAV) or other platform along a flight or other pre-planned path, or by using plural unmanned air vehicles (UAV) or other platforms each collecting a measurement at one or more locations along that path. In other words, measurements from plural locations may be ascertained via a single platform traveling to different locations, or via plural platforms each positioned at different locations and networking or otherwise sharing the collected data for the geolocation determination. Since measurement errors exist due to path loss modeling, signal fading, shadowing effects, noise/interference, antenna pattern effects, time-varying channel and transmit power effects, and implementation errors, a Least Mean Square (LMS) technique is preferably employed to determine the location of radio frequency (RF) emitters. Although FIG. 1, by way of example only, indicates measurements at certain locations (e.g., $(x_0, y_0, z_0)$, $(x_1, y_1, z_1)$, and $(x_n, y_n, z_n)$ as viewed in FIG. 1), any quantity of received signal MSNR measurements (e.g., $p_i$, where i=0 to N) may be collected at any corresponding locations $((x_i, y_i, z_i),$ where i=0 to N) within the three-dimensional space (i.e., radio frequency (RF) digital samples may be collected at numerous locations).

For ease of illustration, the techniques of present invention embodiments will be described with respect to radio frequency (RF) emitter 120. Present invention embodiments resolve the location of radio frequency (RF) emitter 120 by estimating the energy or received signal strength (RSS) of signals emitted from emitter 120 via the received signal strength (RSS) measurements ascertained from plural locations (e.g., $p_0, p_1, p_n$ measured at locations $(x_0, y_0, z_0)$, $(x_1, y_1, z_1)$, and $(x_n, y_n, z_n)$ as viewed in FIG. 1) along path 110 based on the narrowband blind source separation (BSS) data 263. The received signal strength (RSS) measurements are each proportional to the distance between the location of that measurement and radio frequency (RF) emitter 120 (e.g., $r_0, r_1, r_n$ as viewed in FIG. 1) as described above. The measurements are utilized in a set of simultaneous equations to determine the location of the radio frequency (RF) emitter within the three-dimensional space as described below.

Mobile sensor 100 or processing center 150 uses a processing block that includes an energy-based geolocation module (e.g., energy-based emitter geolocation (EBEG) module 270) to compute geolocation data for each emitter within a given area. Initially, one or more mobile sensors 100 or ground based sensors measure received signal strength (RSS) of signals emitted from radio frequency (RF) emitter 120 at one or more locations (e.g., a quantity of locations from 0 through N as described below) along path 110 (e.g., using signal-to-noise ratio (SNR) enhancer and energy estimation module 410). A set of simultaneous equations to determine the geolocation of the radio frequency (RF) emitter based on the received signal strength (RSS) measurements are determined, and converted into matrix form (e.g., by system formulation module 420). In particular, the location of radio frequency (RF) emitter 120 within the three-dimensional space may be represented by the coordinates (x, y, z), while the position of mobile sensor 100 ascertaining a measurement at an $i^{th}$ location along path 110 may be represented by the coordinates ($x_i$, $y_i$, $z_i$). The distance, $r_i$, in the three-dimensional space between the location of the radio (RF) frequency emitter (e.g., (x, y, z)) and the $i^{th}$ measuring location (e.g., ($x_i$, $y_i$, $z_i$)), may be expressed as the following:

$$r_i^2 = (x-x_i)^2 + (y-y_i)^2 + (z-z_i)^2; \text{for } i=0 \text{ to } N. \quad \text{(Equation 1)}$$

The distance (e.g., $d_i$, for i=0 to N) between a reference origin in the three-dimensional space (e.g., (0, 0, 0)) and a location of mobile sensor 100 (e.g., ($x_i$, $y_i$, $z_i$)) may be expressed as the following:

$$d_i^2 = x_i^2 + y_i^2 + z_i^2; \text{for } i=0 \text{ to } N. \quad \text{(Equation 2)}$$

The difference of the square of the distances (e.g., $r_i^2 - r_0^2$) for the $i^{th}$ measuring location (e.g., ($x_i$, $y_i$, $z_i$)) and an arbitrary reference location of mobile sensor 100 (e.g., ($x_0$, $y_0$, $z_0$)) may be expressed (based on Equations 1 and 2) as the following:

$$r_i^2 - r_0^2 = d_i^2 - d_0^2 - 2x(x_i-x_0) - 2y(y_i-y_0) - 2z(z_i-z_0); \text{for } i=1 \text{ to } N, \quad \text{(Equation 3)}$$

where this equation (Equation 3) may be equivalently expressed as the following equation:

$$\left[\frac{r_i^2}{r_0^2} - 1\right] r_0^2 + 2x(x_i-x_0) + 2y(y_i-y_0) + 2z(z_i-z_0) = d_i^2 - d_0^2. \quad \text{(Equation 4)}$$

The above equation (Equation 4) may be simplified by employing a parameter, $\beta_i$, which corresponds to the $i^{th}$ measuring location, and may be expressed as follows:

$$\beta_i = \left[\frac{r_i^2}{r_0^2} - 1\right]; \quad \text{(Equation 5)}$$

for $i = 1$ to $N$.

In addition, the terms of the above equation (Equation 4) may be converted to matrix form and employ the parameter, $\beta_i$ (from Equation 5). The equation terms may be expressed by matrices P (e.g., representing terms on the left side of the equal sign in Equation 4) and R (e.g., representing terms on the right side of the equal sign in Equation 4) as follows:

$$P = \begin{bmatrix} \beta_1 & 2(x_1-x_0) & 2(y_1-y_0) & 2(z_1-z_0) \\ \beta_2 & 2(x_2-x_0) & 2(y_2-y_0) & 2(z_2-z_0) \\ \vdots & \vdots & \vdots & \vdots \\ \beta_N & 2(x_N-x_0) & 2(y_N-y_0) & 2(z_N-z_0) \end{bmatrix},$$

$$R = \begin{bmatrix} d_1^2 - d_0^2 \\ d_2^2 - d_0^2 \\ \vdots \\ d_N^2 - d_0^2 \end{bmatrix}$$

The overall equation (Equation 4) may be represented by the following matrix equation:

$$P \cdot \begin{bmatrix} r_0^2 \\ x \\ y \\ z \end{bmatrix} = R \quad \text{(Equation 6)}$$

The terms $x_i$, $y_i$, $z_i$, (for i=0 to N) within matrix P represent the known positions or coordinates in the three-dimensional space where mobile sensor 100 ascertains the received signal strength (RSS) measurements, while the terms $r_0^2$, x, y, and z in the solution matrix are unknown and to be solved by the above equation (Equation 6). The determined values for x, y, and z represent the coordinates (or location) of radio frequency (RF) emitter 120 within the three-dimensional space, while the determined value for $r_0^2$ represents the square of the distance between radio frequency (RF) emitter 120 and the known reference location (e.g., at coordinates $x_0$, $y_0$, and $z_0$ within the three-dimensional space) of mobile sensor 100.

The values for the unknown variables (e.g., $r_0^2$, x, y, and z) indicating the location of radio frequency (RF) emitter 120 may be determined by solving for these variables in Equation 6, thereby providing the following expression:

$$\begin{bmatrix} r_0^2 \\ x \\ y \\ z \end{bmatrix} = (P^T P)^{-1} P^T R, \quad \text{(Equation 7)}$$

where $P^T$ represents the transpose of matrix P, and $(P^T P)^{-1}$ represents the inverse of the product of matrix P and the transpose of matrix P.

In order to determine the unknown variables (e.g., $r_0^2$, x, y, and z) indicating the location of radio frequency (RF) emitter 120 in the above equation (Equation 7), the parameter, $\beta_i$, of matrix P may be estimated based on the measurements of received signal strength (RSS) obtained by mobile sensor 100. Considering the line of sight (LOS) propagation loss between mobile sensor 100 (e.g., unmanned air vehicle (UAV)) and radio frequency (RF) emitter 120, the received signal power, $p_i$, at the $i^{th}$ location along path 110 is inversely proportional to the square law of the distance, $r_i$, between the mobile sensor (e.g., unmanned air vehicle (UAV)) and the radio frequency (RF) emitter. Assuming the power of radio frequency (RF) emitter 120 remains constant during the measurements of received signal strength (RSS) along path 110, the parameter, $\beta_i$, may be estimated based on the received signal strength (RSS) or power measurements as follows:

$$\beta_i = \left[\frac{r_i^2}{r_0^2} - 1\right] \cong \left[\frac{p_0}{p_i} - 1\right]; \quad \text{(Equation 8)}$$

for $i = 1$ to $N$.

At least four independent equations (or at least four rows of matrices P and R) are required to determine the four unknown variables (e.g., $r_0^2$, x, y, and z) and, hence, the location of radio frequency (RF) emitter 120. However, measurements from at least five locations are required to provide estimates for the parameter, $\beta_i$ (e.g., a reference measurement for $p_0$, and a measurement for each $p_i$, for i=1 to 4).

The estimates for the parameter, $\beta_i$ (for i=1 to N), and the various terms that can be derived from the known measuring locations of mobile sensor 100 (e.g., $x_i$, $y_i$, $z_i$ (for i=0 to N); $d_i^2$ (for i=0 to N), etc.) are applied to matrices P and R. The applied values within matrices P and R are utilized in Equation 7 to determine the values for the unknown variables (e.g., $r_0^2$, x, y, and z) in the solution matrix. Since there are path loss model errors, signal fading and/or shadowing effects, noise, interference, and implementation errors that impact the measurement, the above determination (Equations 1-7) is formulated to provide a Least Mean Square (LMS) solution for the variables in the solution matrix.

The determined Least Mean Square (LMS) values for x, y, and z within the solution matrix (derived from Equation 7) represent the coordinates of radio frequency (RF) emitter 120 within the three-dimensional space, and are utilized to provide the Least Mean Square (LMS) location of the radio frequency (RF) emitter within that space. Further examples of the energy-based geolocation technique described above may be found in U.S. patent application Ser. No. 13/049,443, entitled "System and Method for Three-Dimensional Geolocation of Emitters Based on Energy Measurements" and filed on Mar. 16, 2011, the entirety of which is incorporated by reference herein. The locations of emitters 130 and 140 may be determined in a similar manner (i.e., for M emitters, M matrices or an M-dimensional matrix may be solved).

Figure 5:
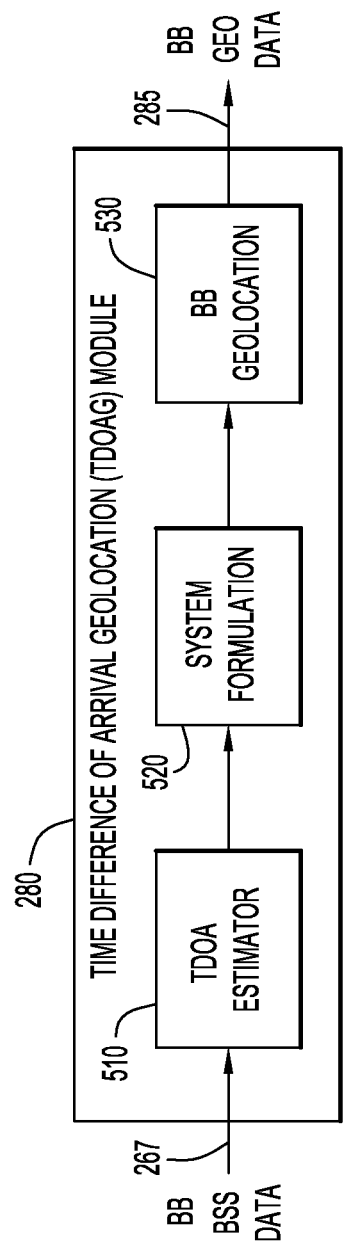
FIG. 5 is block diagram detailing a time difference of arrival geolocation (TDOAG) module shown in FIG. 2.

Broadband (BB) blind source separation (BSS) data 267 are processed by time difference of arrival geolocation (TDOAG) module 280 shown in detail in FIG. 5. Time difference of arrival geolocation (TDOAG) module 280 comprises a time difference of arrival estimation module 510, a system formulation module 520, and a geolocation module 530. Modules 510-530 may be implemented in software, hardware, or a combination of both. Broadband (BB) blind source separation (BSS) data 267 are first processed by time difference of arrival estimation module 510. Time difference of arrival estimation module 510 uses known hyperbolic techniques to establish a range difference ($\Delta r$) based on the time difference of arrival ($\Delta t$) of emitter signals. Since $\Delta r = c\Delta t$, where c denotes the speed of light, $\Delta r$ can be computed from $\Delta t$, where $\Delta t$ is equal to time of arrival $t_1$ at a first measurement location minus time of arrival $t_2$ at a second measurement location ($t_1 - t_2$).

The time difference of arrival geolocation (TDOAG) algorithm described below uses the same reference coordinate system (FIG. 1) and notation used to describe the energy-based geolocation algorithm. The position of mobile sensor 100 ascertaining a measurement at an $i^{th}$ location along path 110 may be represented by the coordinates ($x_i$, $y_i$, $z_i$). The distance, in the three-dimensional space between the location of the radio (RF) frequency emitter (e.g., (x, y, z)) and the $i^{th}$ measuring location (e.g., ($x_i$, $y_i$, $z_i$)), may be expressed as the following:

$$r_i^2 = (x-x_i)^2 + (y-y_i)^2 + (z-z_i)^2; \text{for } i=0 \text{ to } N. \quad \text{(Equation 9)}$$

The distance (e.g., $d_i$, for i=0 to N) between a reference origin in the three-dimensional space (e.g., (0, 0, 0)) and a location of mobile sensor 100 (e.g., ($x_i$, $y_i$, $z_i$)) may be expressed as the following:

$$d_i^2 = x_i^2 + y_i^2 + z_i^2; \text{for } i=0 \text{ to } N. \quad \text{(Equation 10)}$$

When i=0, the reference location, the range from the emitter to the reference location is:

$$r_0^2 = (x-x_0)^2 + (y-y_0)^2 + (z-z_0)^2$$

The range difference from the emitter to $i^{th}$ location and to the reference location is:

$$\Delta r_i = r_i - r_0 \text{(which is also equal to } c(t_i - t_0))$$

Rearranging the terms and squaring yields:

$$(r_0 - \Delta r_i)^2 = r_i^2$$

Expanding the terms and adding the equivalence from Equation 10 yields:

$$(r_0 + \Delta r_i)^2 = r_0^2 + 2r_0\Delta r_i + (\Delta r_i)^2 = r_i^2 = (x-x_i)^2 + (y-y_i)^2 + (z-z_i)^2$$

And in simplified form:

$$r_0^2 + 2r_0\Delta r_i + (\Delta r_i)^2 = (x-x_i)^2 + (y-y_i)^2 + (z-z_i)^2 \quad \text{(Equation 11)}$$

Again from Equation 10, let $d_i^2 = x_i^2 + y_i^2 + z_i^2$; for i=0 to N. Subtracting Equation 10 from Equation 11 gives the following equation:

$$2r_0\Delta r_i + (\Delta r_i)^2 = d_i^2 - d_0^2 - 2[x(x_i - x_0) + y(y_i - y_0) + z(z_i - z_0)]$$

Rearranging the terms yields:

$$2[x(x_i - x_0) + y(y_i - y_0) + z(z_i - z_0)] + 2r_0\Delta r_i = d_i^2 - d_0^2 - (\Delta r_i)^2 \quad \text{(Equation 12)}$$

Equation 12 lends itself to matrix formulation. The time difference of arrival geolocation (TDOAG) algorithm can be formulated in a matrix format, $P \cdot U = R$:

$$P = \begin{bmatrix} 2\Delta r_1 & 2(x_1 - x_0) & 2(y_1 - y_0) & 2(z_1 - z_0) \\ 2\Delta r_2 & 2(x_2 - x_0) & 2(y_2 - y_0) & 2(z_2 - z_0) \\ \vdots & \vdots & \vdots & \vdots \\ 2\Delta r_m & 2(x_m - x_0) & 2(y_m - y_0) & 2(z_m - z_0) \end{bmatrix}; \quad \text{(Equation 13)}$$

$$U = \begin{bmatrix} r_0 \\ x \\ y \\ z \end{bmatrix}; \text{ and}$$

$$R = \begin{bmatrix} d_1^2 - d_0^2 - (\Delta r_1)^2 \\ d_2^2 - d_0^2 - (\Delta r_2)^2 \\ \vdots \\ d_m^2 - d_0^2 - (\Delta r_m)^2 \end{bmatrix}$$

The four unknowns in matrix U (Equation 13) can be solved with at least 4 independent equations with the measurements from 5 independent locations. Note that the variables ($x_0$, $y_0$, $z_0$) and ($x_1$, $y_1$, $z_1$) to ($x_m$, $y_m$, $z_m$) in matrix P are known and relate to the locations of the signal measurements, while the variables $\Delta r_1 - \Delta r_m$ and $d_0 - d_m$ in matrices P and R are computed as described above from known values.

As measurements from the various locations i, i=1 to N, are received or computed by mobile sensor 100, or by processing center 150, system formulation module 520 loads the data of interest into matrices P and R. When enough samples are obtained, geolocation module 530 computes the unknowns in Equation 13 to generate broadband (BB) geolocation data 285 for various emitters based on the broadband (BB) blind source separation (BSS) data 267. To determine the location of multiple (M) emitters, M matrices or an M-dimensioned matrix may be solved.

Figure 6:
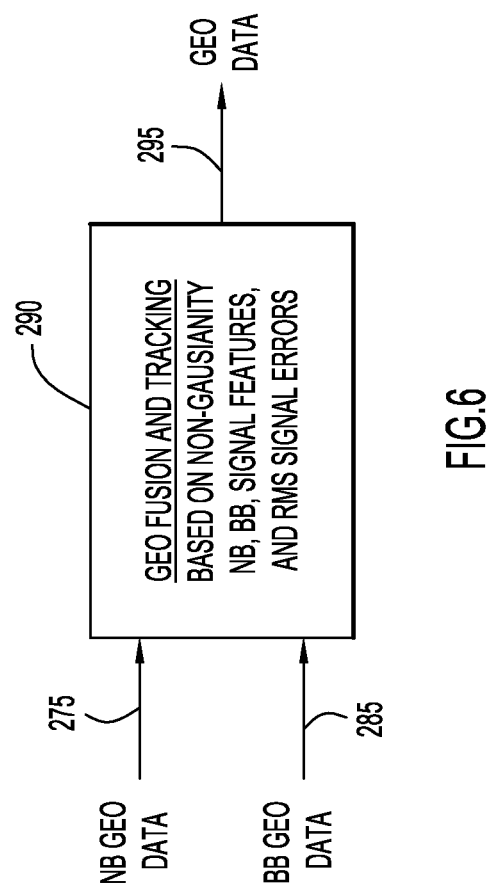
FIG. 6 is block diagram detailing a geolocation fusing and tracking module shown in FIG. 2.

Geolocation fusion and tracking module 290 for determining an overall set of geolocation data according to an embodiment of the present invention is illustrated in FIG. 6. Geolocation fusion and tracking module 290 combines narrowband (NB) geolocation data 275 (from energy-based emitter geolocation (EBEG) module 270) and broadband (BB) geolocation data 285 (from time difference of arrival geolocation (TDOAG) module 280) to determine geolocation data 295. Module 290 bases geolocation data combining on the non-Gaussianity (non-noise like/signal spectral flatness), narrowband (NB), and broadband (BB) signal features or characteristics, as well as the root mean square (RMS) signal errors.

Combined geolocation results (e.g., geolocation data 295) depend on many factors such as the sensor platform-to-emitter range, platform heading, relative platform-emitter geometry, platform/emitter speed, number of measurements (elapsed time), signal types, interference, radio frequency (RF) propagation effects, antenna resources, and the accuracy of the sensor. In addition, not all sensor platforms have the same antenna and processing resources, so each platform type may have different sensor measures with different quality of measures. The quality of measures will be used to optimally estimate the emitter locations. In general, the algorithms use energy-based geolocation for narrowband and short-duration signals, and time difference of arrival (TDOA) geolocation for broadband and long duration signals (e.g., time difference of arrival (TDOA) geolocation may be better suited for emitters in urban areas, while a combination of energy-based and time difference of arrival (TDOA) geolocation may be better suited for emitters in open terrain). Accordingly, geolocation data 295 may be a weighted combination of narrowband and broadband geolocation information (e.g., geolocation=narrowband geolocation*$w_1$+broadband geolocation*$w_2$), where the weight values or vectors ($w_1$, $w_2$) are in the range from zero to one, and are assigned to account for signal characteristics, signal errors, terrain or environment, and the above-listed factors.

Figure 7:
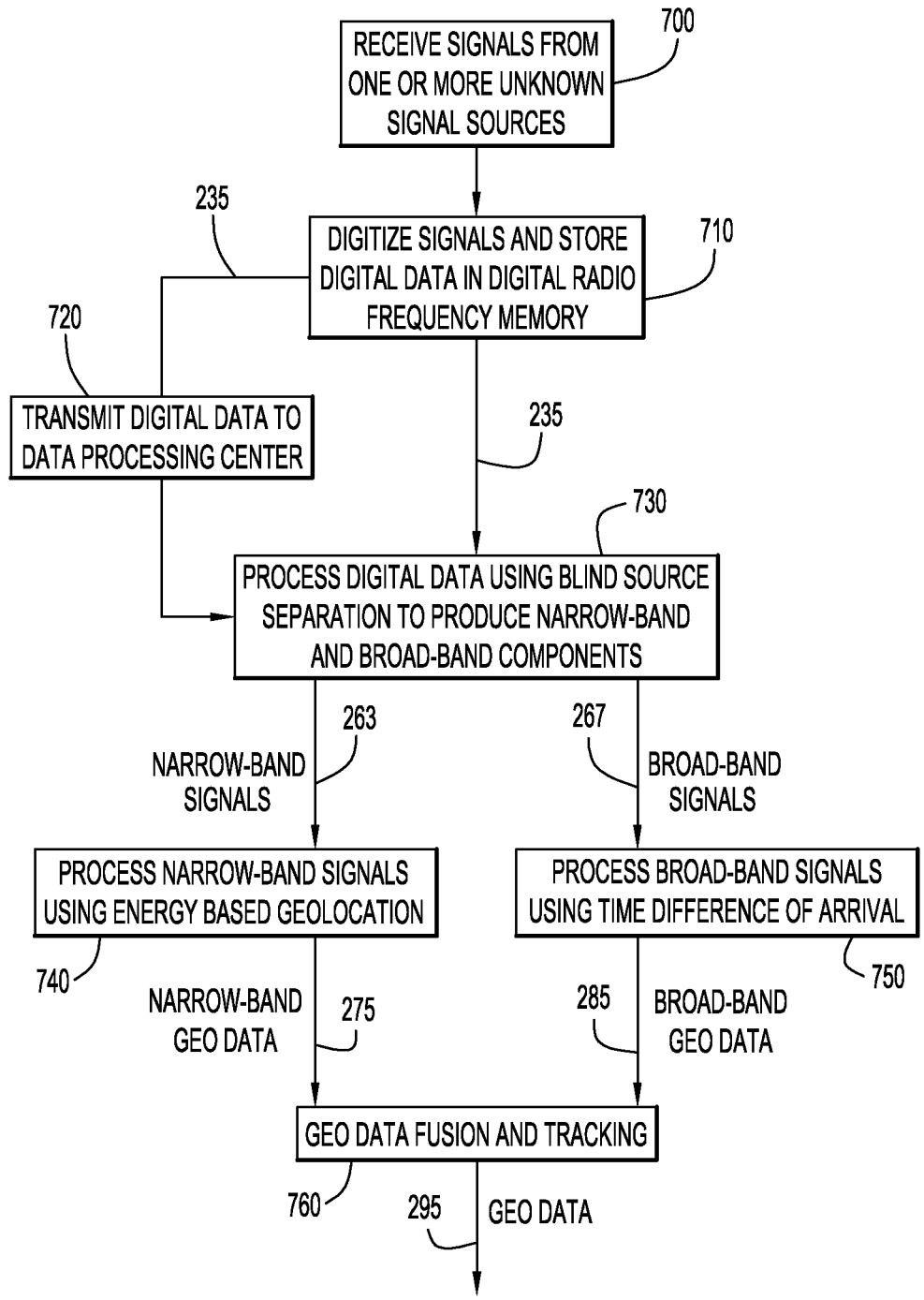
FIG. 7 is a procedural flow chart illustrating a manner in which multiple unknown radio frequency (RF) sources are geolocated according to an embodiment of the present invention.

The manner in which processor 225 (FIG. 2) (e.g., via one or more processing modules) determines the geolocation of a radio frequency (RF) emitter based on signal measurements at various locations is illustrated in FIG. 7. Initially, signals are received from one or more unknown radio frequency (RF) sources at step 700. The received signals are digitized and stored in memory at step 710. The memory may be digital radio frequency (RF) memory 235 (FIG. 2) as described above. Optionally, the contents of digital radio frequency (RF) memory 235 may be transmitted to data processing center 150 (FIG. 1) or another sensor at step 720. The contents of digital radio frequency (RF) memory 235 may also be retained on board mobile sensor 100 for further assessment.

The digital data are processed using blind source separation (BSS) techniques at step 730 (e.g., by blind source separation (BSS) module 260 as described above). The blind source separation (BSS) separation techniques produce narrowband (NB) signals 263 and broadband signals 267. The narrowband (NB) signals 263 are processed into narrowband (NB) geolocation data 275 at step 740 (e.g., by energy-based emitter geolocation (EBEG) module 270), while broadband (BB) signals 267 are processed into broadband (BB) geolocation data 285 (e.g., time difference of arrival geolocation (TDOAG) module 280) at step 750. Narrowband (NB) geolocation data 275 and broadband (BB) geolocation data 285 are fused to determine geolocation data 295 at step 760.

It will be appreciated that the embodiments described above and illustrated in the drawings represent only a few of the many ways of implementing a system and method for geolocating multiple unknown radio frequency signal sources.

The environment of the present invention embodiments may include any quantity of mobile or fixed-based sensors, processing centers, and emitters of interest. The emitters may be implemented by any quantity of any conventional or other devices emitting radio frequency (RF) or any other suitable energy signals (e.g., energy signals in any suitable bands (e.g., infrared, microwave, optical, etc.)). The emitters may be located at any quantity of any desired locations within the three-dimensional space of the environment. The mobile sensors may be implemented by any quantity of any conventional or other mobile or stationary vehicle or platform (e.g., unmanned air vehicle (UAV), air vehicle, ground vehicle, platform or structure mounted at a location or on a vehicle, etc.), and may include any quantity of any conventional or other sensing device (e.g., RF or other sensor, etc.). The mobile sensors may each measure any desired characteristics of emitted signals at any one or more locations within the environment.

The pre-planned path may traverse any desired locations within the environment, where any quantity of measurements may be obtained during traversal of the path. Further, measurements may be obtained at any locations residing within a specified offset or range from the pre-planned path. Alternatively, the path may be determined in random fashion.

The emitter detection antenna may be implemented by any conventional or other antenna (e.g., omni-directional, directional, etc.) configurable to receive the signals emitted from the one or more emitters. The receiver may be implemented by any conventional or other receiving device capable of receiving the emitted radio frequency (RF) or other energy signals. A radiometer may be implemented by any conventional or other device to measure the energy or received signal strength (RSS) or other characteristics of a received signal. The radiometer may be included within or separate from the receiver.

The processor may be implemented by any quantity of any conventional or other computer systems or processing units (e.g., a microprocessor, a microcontroller, systems on a chip (SOCs), fixed or programmable logic, etc.), and may include any commercially available or custom software (e.g., communications software, geolocation modules, etc.).

It is to be understood that the software (e.g., geolocation modules, blind source separation (BSS) modules, etc.) for the processor of the present invention embodiments may be implemented in any desired computer language and could be developed by one of ordinary skill in the computer arts based on the functional descriptions contained in the specification and flow charts illustrated in the drawings. Further, any references herein of software performing various functions generally refer to computer systems or processors performing those functions under software control. The processor of the present invention embodiments may alternatively be implemented by any type of hardware and/or other processing circuitry. The various functions of the processor may be distributed in any manner among any quantity of software modules or units, processing or computer systems and/or circuitry, where the computer or processing systems may be disposed locally or remotely of each other and communicate via any suitable communications medium (e.g., LAN, WAN, Intranet, Internet, hardwire, modem connection, wireless, satellite, tactical data links, etc.). For example, the functions of the present invention embodiments may be distributed in any manner among the processor, receiver, communications transceiver, and/or external devices. The software and/or algorithms described above and illustrated in the flow charts may be modified in any manner that accomplishes the functions described herein. In addition, the functions in the flow charts or description may be performed in any order that accomplishes a desired operation.

The software of the present invention embodiments (e.g., geolocation modules, blind source separation (BSS) module, etc.) may be available on a program product apparatus or device including a recordable or computer usable medium (e.g., magnetic or optical mediums, magneto-optic mediums, floppy diskettes, CD-ROM, DVD, memory devices, etc.) for use on stand-alone systems or systems connected by a network or other communications medium, and/or may be downloaded (e.g., in the form of carrier waves, packets, etc.) to systems via a network or other communications medium. Further, a tangible recordable or computer usable medium may be encoded with instructions or logic to perform the functions described herein (e.g., embedded logic such as an application specific integrated circuit (ASIC), digital signal processor (DSP) instructions, software that is executed by a processor, etc.).

The memory may be included within or external of the processor, and may be implemented by any conventional or other memory unit with any suitable storage capacity and any type of memory (e.g., random access memory (RAM), read only memory (ROM), etc.). The memory may store any desired information for performing the geolocation technique of present invention embodiments (e.g., location modules, data, etc.). The communications transceiver may be implemented by any quantity of any conventional or other communications device (e.g., wireless communications device, wired communication device, etc.), and may be configured for communication over any desired network (e.g., wireless, cellular, LAN, WAN, Internet, Intranet, VPN, etc.).

The interface unit may be implemented by any quantity of any conventional or other interfaces for integrating any or all of the various communications components of the receiver, processor, and communications transceiver. The interface unit may translate to and from any communications or network protocol.

Present invention embodiments may employ any quantity of variables or equations to determine the estimated location of one or more emitters, provided that the quantity of equations is greater than or equal to the quantity of unknown variables. Further, any conventional or other techniques may be employed to produce the location estimate with minimal error (e.g., Least Mean Square (LMS), etc.). The equations may be represented in any desired form (e.g., matrix form, vectors, scalars, etc.), and be solved in any desired fashion to enable determination of the emitter location. The location estimate may be produced and/or converted to any desired form, and may be provided with respect to any desired reference (e.g., coordinates within the space, longitude and latitude indications, GPS coordinates, etc.).

Combined geolocation data may be obtained from any suitable combination of narrowband geolocation data and/or broadband geolocation data with the understanding that for any given geolocation solution that either the narrowband geolocation data or the broadband geolocation data may not be available or reliable enough to combine. Further, combined geolocation data may be computed using any suitable means including averaging, weighted averaging, using linear or non-linear methods, or known signal combining techniques, e.g., maximal ratio combining, Eigen-based techniques, etc.

The resulting location estimate may be utilized for any suitable applications in addition to emitter analysis (e.g., generation of a map image of the area, vehicle or other platform guidance systems to direct the vehicle or platform toward or away from areas, radar or other detection systems, etc.).

The various indices (e.g., i, N, etc.) are preferably integers, but may be any types of numbers with any suitable numeric ranges.

It is to be understood that the terms "top", "bottom", "front", "rear", "side", "height", "length", "width", "upper", "lower", "vertical" and the like are used herein merely to describe points of reference and do not limit the present invention to any particular orientation or configuration.

From the foregoing description, it will be appreciated that the invention makes available a novel system and method for geolocation of multiple unknown radio frequency (RF) sources using received signal energy and time difference of arrival (TDOA) measurements, wherein locations of radio frequency (RF) emitters in a three-dimensional space are determined based on energy or received signal strength (RSS) measurements from narrowband signals and time difference of arrival (TDOA) measurements from broadband signals received from emitters at various locations. The energy-based geolocations and the time difference of arrival (TDOA) geolocations are fused to determine the locations of multiple unknown radio frequency (RF) sources.

Having described example embodiments of a new and improved system and method for geolocation of multiple unknown radio frequency (RF) sources, it is believed that other modifications, variations and changes will be suggested to those skilled in the art in view of the teachings set forth herein. It is therefore to be understood that all such variations, modifications and changes are believed to fall within the scope of the present invention as defined by the appended claims.

What is claimed is:

1. A system for locating an emitter within an area comprising:
   a receiver to receive signals transmitted by said emitter at a plurality of different locations within said area;
   a sampling module to digitize said received signals to produce digital signals;
   a memory to store said digital signals;
   a processor to process said digital signals to locate said emitter within said area, wherein said processor includes:
      a blind source separation module to separate said digital signals into narrowband and broadband components;
      an energy-based geolocation module to process said narrowband components and determine a first three-dimensional location of said emitter within said area based on energy measures of said narrowband components, wherein said energy measures are proportional to distances between said emitter and each of said plurality of locations;
      a time difference of arrival based geolocation module to process said broadband components and determine a second three-dimensional location of said emitter within said area based on time differences of reception times of said received signals at each of said plurality of locations, wherein said time differences are proportional to range differences between said plurality of locations and said emitter; and a combiner module to combine said first three-dimensional location with said second three-dimensional location to determine a combined three-dimensional location of said emitter within said area.

2. The system of claim 1, wherein said a blind source separation module includes:
a preprocessing module to decorrelate said digital signals;
a signal separation module to separate said decorrelated signals; and
a post processing module to generate said narrowband components and said broadband components from said separated signals.

3. The system of claim 2, wherein said preprocessing module generates a covariance matrix from said digital signals and decorrelates said digital signals by applying a transform to said covariance matrix such that a new set of data are generated that approximate white noise.

4. The system of claim 2, wherein said preprocessing module decorrelates said digital signals performing principle component analysis.

5. The system of claim 2, wherein said signal separation module separates said decorrelated signals using independent component analysis.

6. The system of claim 2, wherein said post-processing module generates said narrowband components and said broadband components using signal deflation and reconstruction on said separated signals.

7. The system of claim 1, wherein said energy-based geolocation module includes:
a signal to noise ratio enhancement and energy estimation module to enhance a signal to noise ratio of said narrowband components and estimate an energy level for said enhanced narrowband components;
a system formulation module to manage said narrowband components and load said estimated energy levels into said memory; and
a location module to determine said first three-dimensional location of said emitter based on said estimated energy levels of said narrowband components.

8. The system of claim 7, wherein said signal to noise ratio enhancement and energy estimation module enhances said signal to noise ratio of said narrowband components using iterative power subtraction and filtering.

9. The system of claim 7, wherein said location module determines said first three-dimensional location by solving a set of simultaneous equations relating to said distances, wherein said set of simultaneous equations include unknown variables representing coordinates of said first three-dimensional location of said emitter within said area.

10. The system of claim 1, wherein said time difference of arrival based geolocation module includes:
a time difference of arrival estimation module to estimate time differences of arrival for said broadband components between each of said plurality of locations;
a system formulation module to manage and load said time difference of arrival estimates into said memory; and
a location module to determine said second three-dimensional location of said emitter based on said estimated time differences of arrival.

11. The system of claim 10, wherein said location module determines said second three-dimensional location by solving a set of simultaneous equations relating to said range differences, wherein said set of simultaneous equations include unknown variables representing coordinates of said second three-dimensional location of said emitter within said area.

12. The system of claim 1, wherein said combiner module combines said first three-dimensional location with said second three-dimensional location to determine said combined three-dimensional location of said emitter based on one or more of signal non-Gaussianity, narrowband signal features, broadband signal features, and root means square signal errors.

13. The system of claim 1, wherein said combiner module tracks movement of said emitter.

14. The system of claim 1, further comprising:
a transceiver to transmit and receive digitized radio frequency data.

15. A method for locating an emitter within an area comprising:
(a) receiving signals transmitted by said emitter via a receiver at a plurality of different locations within said area;
(b) sampling said received signals to produce digital signals;
(c) storing said digital signals in memory;
(d) processing said digital signals, via a processor, wherein step (d) further includes:
(d.1) separating said digital signals into narrowband and broadband components;
(d.2) determining a first three-dimensional location of said emitter within said area based on energy measures of said narrowband components, wherein said energy measures are proportional to distances between said emitter and each of said plurality of locations;
(d.3) determining a second three-dimensional location of said emitter within said area based on time differences of reception times of said received signals at each of said plurality of locations, wherein said time differences are proportional to range differences between said plurality of locations and said emitter; and
(d.4) combining said first three-dimensional location with second three-dimensional location to determine a combined three-dimensional location of said emitter within said area.

16. The method of claim 15, wherein step (d.1) further includes:
(d.1.1) decorrelating said digital signals;
(d.1.2) separating said decorrelated signals; and
(d.1.3) generating said narrowband components and said broadband components from said separated signals.

17. The method of claim 16, wherein step (d.1.1) comprises decorrelating said digital signals by generating a covariance matrix from said digital data and decorrelating said digital signals by applying a transform to said covariance matrix such that a new set of data are generated that approximate white noise.

18. The method of claim 16, wherein step (d.1.1) comprises decorrelating said digital signals by performing principle component analysis on said digital signals.

19. The method of claim 16, wherein step (d.1.2) comprises separating said decorrelated signals by performing independent component analysis on said decorrelated signals.

20. The method of claim 16, wherein step (d.1.3) comprises generating said narrowband components and said broadband components by performing signal deflation and reconstruction on said separated signals.

21. The method of claim 15, wherein step (d.2) further includes:
(d.2.1) enhancing a signal to noise ratio of said narrowband components;
(d.2.2) estimating an energy level for said enhanced narrowband components;
(d.2.3) managing and loading said estimated energy levels into said memory; and
(d.2.4) determining said first three-dimensional location of said emitter based on said estimated energy levels of said narrowband components.

22. The method of claim 21, wherein step (d.2.) comprises enhancing said signal to noise ratio of said narrowband components using iterative power subtraction and filtering.

23. The method of claim 21, wherein step (d.2.4) comprises determining said first three-dimensional location by solving a set of simultaneous equations relating to said distances, wherein said set of simultaneous equations include unknown variables representing coordinates of said first three-dimensional location of said emitter within said area.

24. The method of claim 15, wherein step (d.3) further includes:
(d.3.1) estimating time differences of arrival for said broadband components between each of said plurality of locations;
(d.3.2) managing and loading said time difference of arrival estimates into said memory; and
(d.3.3) determining said second three-dimensional location of said emitter based on said estimated time differences of arrival.

25. The method of claim 24, wherein step (d.3.3) comprises determining said second three-dimensional location by solving a set of simultaneous equations relating to said range differences, wherein said set of simultaneous equations include unknown variables representing coordinates of said second three-dimensional location of said emitter within said area.

26. The method of claim 15, wherein step (d.4) comprises combining said first three-dimensional location with said second three-dimensional location to determine said combined three-dimensional location of said emitter based on one or more of narrowband signal and broadband signal non-Gaussianity, narrowband signal features, broadband signal features, and root means square signal errors.

27. The method of claim 15, further including tracking movement of said emitter.

28. The method of claim 15, further including transmitting said digital signals.

* * * * *